(12) United States Patent  
Trydegård et al.

(10) Patent No.: US 8,418,311 B2
(45) Date of Patent: Apr. 16, 2013

(54) WHEEL FOR FLOOR CARE APPLIANCES

(75) Inventors: Anna-Karin Trydegård, Sundbyberg (SE); Esbjörn Svantesson, Täby (SE); Stefan Jonsson, Stockholm (SE); Maria Berndtson, Stockholm (SE)

(73) Assignee: AB Electrolux, Stockholm (SE)

( * ) Notice: Subject to any disclaimer, the term of this patent is extended or adjusted under 35 U.S.C. 154(b) by 725 days.

(21) Appl. No.: 12/521,447

(22) PCT Filed: Dec. 3, 2007

(86) PCT No.: PCT/SE2007/001073
§ 371 (c)(1),
(2), (4) Date: Feb. 22, 2010

(87) PCT Pub. No.: WO2008/082338
PCT Pub. Date: Jul. 10, 2008

(65) Prior Publication Data
US 2010/0170058 A1     Jul. 8, 2010

(30) Foreign Application Priority Data
Dec. 28, 2006   (SE) .................................. 0602834-4

(51) Int. Cl.
A47L 5/00 (2006.01)
(52) U.S. Cl.
USPC ...................... 15/326; 152/8; 152/30; 152/53

(58) Field of Classification Search ................... 15/326; 152/7, 8, 30, 53; 16/18 R; A47L 5/00
See application file for complete search history.

(56) References Cited

U.S. PATENT DOCUMENTS

| 5,255,410 A | 10/1993 | Stein et al. |
| 6,324,714 B1 | 12/2001 | Walz et al. |
| 2004/0103496 A1 | 6/2004 | Worwag |
| 2006/0064828 A1 | 3/2006 | Stein et al. |

FOREIGN PATENT DOCUMENTS

| DE | 19712138 A1 | 9/1998 |
| EP | 0716938 A1 | 6/1996 |
| EP | 0858760 A1 | 8/1998 |
| JP | 04197222 A * | 7/1992 |
| WO | WO 2005/111084 | 11/2005 |

* cited by examiner

Primary Examiner — David Redding
(74) Attorney, Agent, or Firm — Hunton & Williams LLP

(57) ABSTRACT

A vacuum cleaner having a vacuum cleaner body, a suction fan and motor operatively associated with the vacuum cleaner body, and a wheel. The wheel has a wheel body having an axis of rotation, a tread surface, and a cushion layer radially interposed between the wheel body and the tread surface. The cushion layer includes a resilient shell having a plurality of resilient cells therein. The shell and the plurality of cells have one or more gasses in them, and are dimensioned to damp vibrations and impacts between the tread surface and a floor surface that the tread surface contacts as the wheel rotates about the axis of rotation.

18 Claims, 2 Drawing Sheets

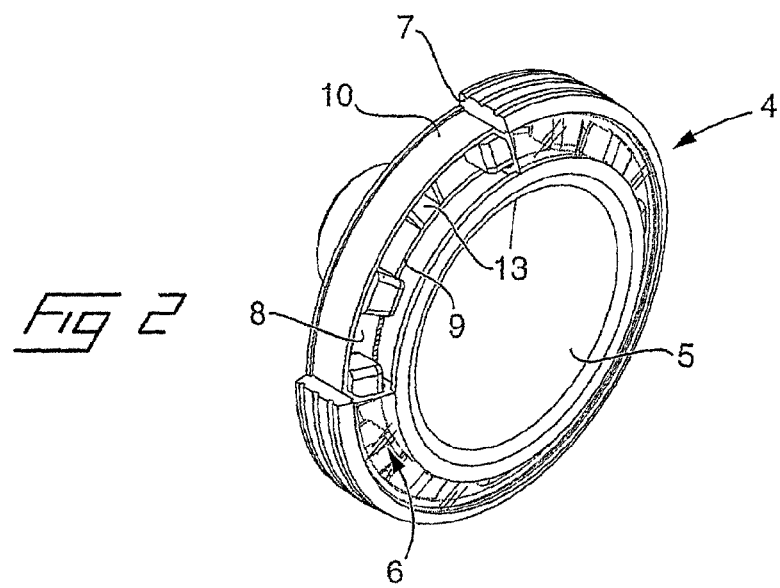
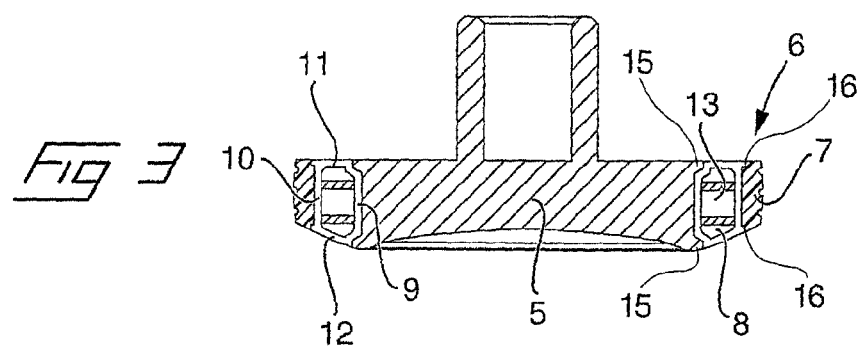
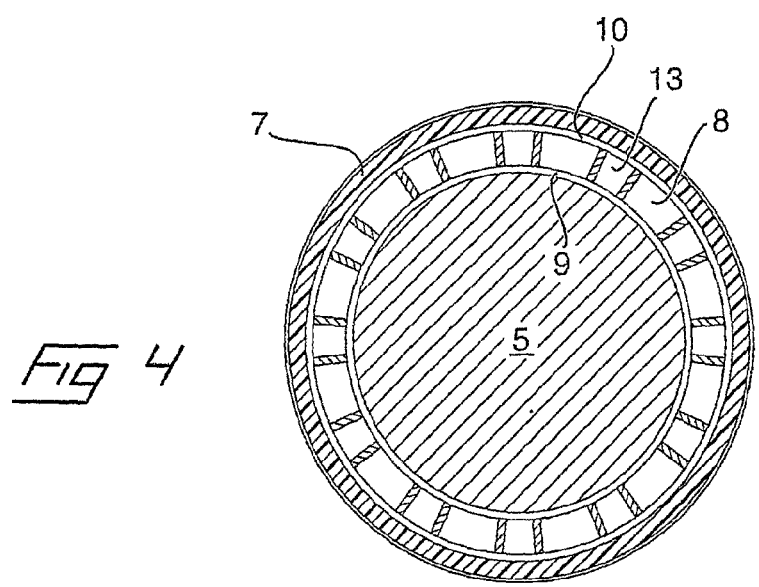

WHEEL FOR FLOOR CARE APPLIANCES

This application claims priority to International Application No. PCT/SE2007/001073 filed Dec. 3, 2007 (published as WO 2008/082338), which claims priority to Swedish Patent Application No. SE 0602834-4 filed Dec. 28, 2006, which is incorporated herein by reference.

The invention relates to a wheel for floor care appliances, such as vacuum cleaners or the like, to allow smooth and easy moving of the appliance over a supporting structure, such as a floor. The wheel includes an axis of rotation, a wheel body and a tread surface.

BACKGROUND OF THE INVENTION

The use of wheels is desirable in connection with different floor care appliances, such as vacuum cleaners and nozzle heads for vacuum cleaners.

To reduce costs, such wheels are normally very simple. Wheels are often formed as a unitary rigid plastic part and sometimes are provided with a tread surface of elastic plastic or rubber. One disadvantage with such a simple wheel structure is that the wheels are quite noisy during use since they can not provide proper sound damping when moved over a floor having a hard surface or when hitting an obstacle such as a doorstep or the like. Such floor care appliances are normally adapted to be used indoors and the noise generated can be very disturbing, especially during late hours or in environments where it is desirable to maintain silence.

Normally, wheels having inflatable tires are not an option for this kind of appliances because such types of wheels often are too expensive to manufacture, need maintenance in the form of occasional pumping, and are susceptible to puncture. Moreover, these kinds of appliances are normally too lightweight for inflatable wheels to be able to provide proper resilient properties and hence damping. Also, inflatable wheels are restricted in terms of alternative design options.

One possibility to overcome the disadvantages above, would be to manufacture the wheel of a soft and elastic plastic, such as foam plastic, which could provide the desirable damping properties. However, such soft plastics are often not sufficiently durable and wear resistant. Also the grip of the wheel with the floor will often be too good, which sometimes is undesirable when the appliance needs to be moved laterally without rotating the wheels. A wheel of this type is disclosed in DE 19712138, wherein a wheel body of a soft and elastic material is sandwiched between two stiffening disks. A similar wheel is disclosed in EP 716938.

In U.S. Pat. No. 5,255,410 is disclosed a wheel, which has a wheel body of a hard material and in a preferred embodiment is assembled of two matching partial wheel elements. The wheel body comprises a circumferential groove in which is positioned an elastic, annular tire having a portion protruding beyond the circumference of the wheel body. Underneath the bottom surface of the tire, there is preferably a deflection space to allow deflection of the tire. The object of this structure is to make it possible to use a tire material having high wear resistance and still achieve a high damping effect. However, this structure allows only for a limited deflection of the tire and hence a low damping effect. Also, a large part of the circumference of the hard material wheel body is exposed on each side of the tire which can bump into obstacles during use and cause unwanted noise.

Another type of a wheel having a damping effect is disclosed in EP 858760. Here, the wheel is formed with an inner support ring and an outer roller ring, which roller ring is manufactured of an elastic material and along one lateral edge is attached to the support ring whereas the opposed edge is free and disposed at a distance from the support ring. Accordingly, the support ring provides for the load-carrying structure whereas the roller ring provides for the damping feature since it can deflect elastically. However, there are several disadvantages associated with such a wheel. Although the roller ring is elastic it is also made of a hard material which, when rolling over a floor, can cause disturbing noise, especially if the floor is covered by sand or other kinds of debris. Moreover, the construction of the wheel has the effect that the diameter of the wheel, and hence the ground clearance, will vary to a large extent depending on the load applied on the appliance. The contact surface of the roller ring against the floor will also be inclined for most of the load situations, which can cause the wheel to deviate in one direction when rolling over the floor. The design of the wheel having one support ring and one roller ring located concentric with a small gap there between, may also cause debris to stick inside the gap which, as the debris build up, eventually will restrict the deflecting action of the roller ring.

SUMMARY OF THE INVENTION

An object of the invention is to overcome the drawbacks of prior art wheels and provide a wheel that exhibits good resilient and damping characteristics for a floor care appliance and yet can be manufactured to a low cost. This object preferably can be achieved by a wheel according to one or more embodiments of the invention, but it will be understood that the objects of the invention are exemplary and not mandatory of all embodiments. The basis of the invention is the insight that the foregoing object may be achieved by a wheel, which comprises a resilient gas cushion layer being provided with a plurality of confined compartments or cells filled with a gas, preferably air. Within this general inventive idea, the invention may be varied in many different ways.

In a hereinafter described and illustrated exemplary embodiment, a resilient gas cushion layer is provided in the form of a ring or tube of a resilient material which is mounted on the circumference of a hub. The tube may be reinforced by a plurality of tubular columns, which may be formed of the same material as the tube and may be evenly distributed over the circumference of the wheel. Each tubular column may extend in a radial direction from an inner circumferential wall of the tube to an outer circumferential wall. The tube as well as the tubular columns are manufactured in the form of a shell structure of a resilient material. The walls of the shell structure preferably have a thickness in the range of 1-3 mm. Accordingly, there is provided a continuous, confined and circumferential gas space inside the tube and separate, confined gas spaces in the tubular columns inside the tube.

However, other forms and embodiments of the air cells are also possible. The tube could, for instance, instead be segmented by partition walls arranged in the radial direction of the wheel in parallel to the rotational axis. In this way the tube will be provided with confined cells lying in sequence along the circumference of the wheel. The cells also could be arranged in two or more layers on top of each other.

The confined cells in the gas cushion layer can optionally be hermetically sealed, such that they are gas tight, and the load-carrying effect will in such a case be performed by the gas pressure inside the cells in combination with the supporting effect from the supporting structure represented by the walls of the shell structure.

As an alternative, the confined cells can be more or less open, such that the walls of the shell structure include, for example, small holes through which the air can dissipate from or enter into the cells depending on whether the cell is exposed to a pressure or not. The open cells can be in fluid communication with the air surrounding the floor care appliance and/or with each other.

In an embodiment having open cells communicating with the surrounding air, at least the long term load-carrying effect is provided entirely or at least mainly by the walls in the shell structure. However, the load-carrying effect in the short term, such as during rotation of the wheel over a floor, can also be provided by the air pressure inside the cells provided that the openings through the walls are sufficiently small such that the air can escape slowly from the cells. It will be appreciated that a slow leak of air can be accomplished by making the holes substantially smaller than the volume of the cell. In this way the air inside the cells will contribute to the damping and resilient effect of the wheel. As soon as the cell in question is released from the load, the air will begin to flow back inside the cell again due to the resilient properties of the shell structure. One advantage with such a construction is that in case of a puncture in one of the cells, the load-carrying effect of that cell, at least within the short term aspect, may be maintained. This makes the wheel generally unaffected by punctures. Another advantage is that the damping and resilient properties from a wheel having open gas cells may also be sufficient for a lightweight floor care appliance, such as a small vacuum cleaner.

In case of hermetically sealed compartments or cells, the gas pressure inside could be a pressure exceeding the atmospheric pressure. However, it is preferred to use an atmospheric pressure inside the cells since this will make the wheel easy and inexpensive to manufacture and lightweight appliances, in most cases, would not require any overpressure to bear the load. Instead, the load-carrying is provided as a combination of the confined gas and the partition walls defining the separate gas cells. In that way, the risk for puncture is minimized but should a puncture nevertheless occur, it is normally restricted to only one gas cell, and the load bearing and damping properties can be taken over by adjacent gas cells and the partition walls confining the gas cells. Moreover, the cells could be filled with arbitrary suitable gases, for instance nitrogen, but for ease of manufacture and reasons of costs, air is preferred.

Preferably, the gas cushion layer is positioned on a rim or hub, which can be formed in many different ways and of different materials. For instance, the hub can be made of metallic or plastic material, can be provided with an integrated rotational shaft or be provided with a hole for accommodating a stationary shaft attached to the appliance.

A tread surface for rolling over a floor can be integrated with and manufactured of the same material as the gas cushion layer. However, a separate tread surface layer can instead be applied on the gas cushion layer. In a hereinafter described and illustrated embodiment of the invention, the gas cushion layer is manufactured of a transparent plastic, which is visible from the outside of the wheel. This creates a visually attractive appearance of the wheel which can be altered by dying the transparent plastic in different colors. A separate, thin tread surface layer of dark rubber or plastic is applied on the outer circumference of the gas cushion layer in this exemplary embodiment.

Although the hereinafter described and illustrated embodiment of the invention is described in relation to application on a vacuum cleaner, it is to be understood that the wheel can be applicable to other kinds of floor care appliances, such as mentioned before or otherwise known in the art.

BRIEF DESCRIPTION OF THE DRAWINGS

The invention will now be described with reference to the drawings in which:

FIG. 2 is a partially cut away perspective view of the wheel in FIG. 1;

FIG. 3 is a cross sectional view of the wheel in FIG. 2, shown in a plane parallel to the rotational axis of the wheel; and FIG. 4 is a cross sectional view of the wheel in FIG. 2, shown in a plane perpendicular to the rotational axis of the wheel.

DETAILED DESCRIPTION OF A PREFERRED EMBODIMENT OF THE INVENTION

Figure 1:
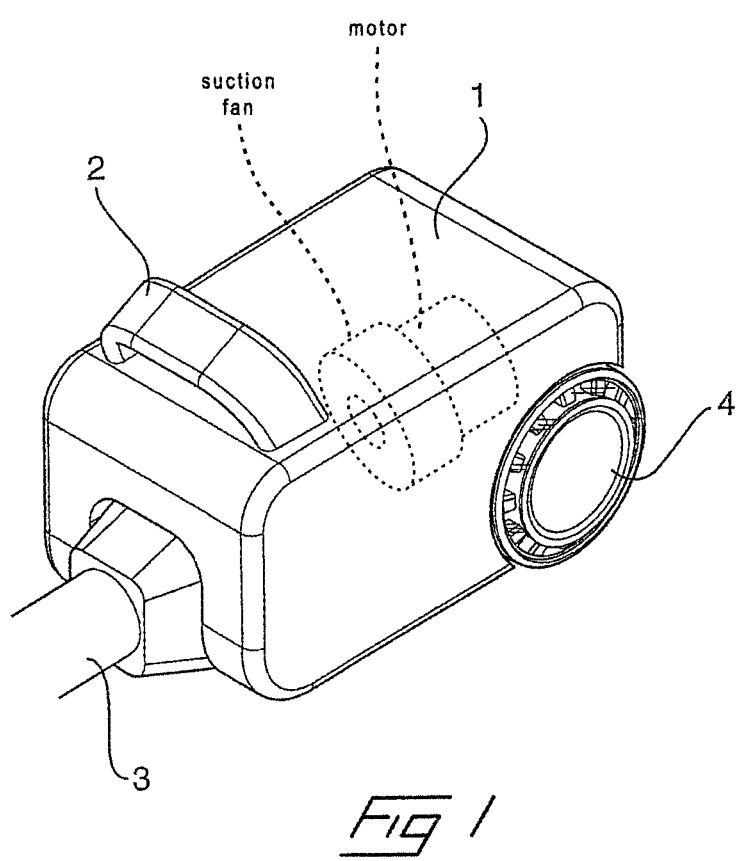
FIG. 1 is a perspective view of a vacuum cleaner equipped with wheels according to the invention.

Reference is first made to FIG. 1, in which is illustrated a possible embodiment of a vacuum-cleaner equipped with wheels according to an exemplary embodiment of the invention. The vacuum cleaner comprises a vacuum cleaner body 1, which accommodates an electrical motor for driving of a suction fan, a handle 2, a vacuum hose 3 and, in a rear portion of the body 1, two large wheels 4 of which only one is visible in the drawing. The vacuum cleaner has one further, small wheel, positioned on the underside in a forward portion of the vacuum cleaner and hence not visible in the drawing.

The wheel 4 is formed in accordance with an exemplary embodiment of the invention, and is illustrated in further detail in FIGS. 2 to 4 in a cutaway perspective view, a cross section in parallel to the rotational axis and a cross section perpendicular to the rotational axis, respectively. As can be seen, the wheel 4 comprises a hub or rim 5, preferably made of rigid plastic, which is rotatably attached to the vacuum cleaner body. On the outer circumference of the hub 5, a gas cushion layer 6 is applied, which is manufactured of a transparent, resilient plastic. Finally, a tread surface layer 7 of a resilient plastic or rubber material, is applied on the outer circumference of the gas cushion layer 6.

The gas cushion layer 6 comprises an annular tube, which defines and encloses a continuous, circumferential gas cell 8 around the wheel. The tube is defined by wall portions of a transparent, resilient plastic material having a preferred thickness of about 1-3 mm. More precisely, the exemplary tube is defined by a radially inner wall portion 9, a radially outer wall portion 10 as well as axially inner and outer side wall portions 11 and 12, respectively. (For clarity, the wall portions 9, 10, 11 and 12 are shown without cross-hatching in FIGS. 3-4.) Inside the tube are several, separate, reinforcing, confined gas cells 13, each of which has the form of a tubular column extending from the radially inner wall portion 9 to the radially outer wall portion 10 of the tube. Also the cells 13 may be formed of a transparent, resilient plastic material having a preferred thickness of about 1-3 mm, and each cell 13 may encloses a confined gas space. Seen in cross section the cells 13 have a more or less rectangular shape. In this way the confined compartments or cells 8, 13 are formed. More precisely one annular cell 8 extending around the circumference of the wheel may be formed, and several confined, separate cells 13 may be distributed around the circumference of the wheel and positioned inside the annular cell 8. Suitably the cell 8 as well as the cells 13 may each be of the open type having at least one opening, which is not shown in the drawings, through the wall of the shell structure to allow air to escape from or enter into the cell during applying or releasing pressure to or from the cell, as described hereinbefore.

The tread surface layer 7 is threaded or otherwise connected to the outer circumference of the gas cushion layer 6. Similarly, the gas cushion layer 6 is threaded or otherwise connected to the outer circumference of the hub 5. The tread surface layer 7, the gas cushion layer 6 and the hub 5 are attached to each other, suitably by means of adhesives. As shown in FIG. 3, small radially extending walls 15 may be formed on the hub 5 to hold or help hold the gas cushion layer, and small radially extending walls 16 may be formed on the gas cushion layer 6 to hold or help hold the tread surface layer 7. These walls may be inverted in other embodiments (i.e., formed on the other parts).

It will be appreciated and understood that the foregoing description of exemplary embodiments is not intended to limit the invention, but is instead provided for convenience to assist the reader with understanding the claimed invention. Numerous variations to the foregoing embodiments and to the claimed subject matter will be readily apparent to persons of ordinary skill in the art in view of the present disclosure.

The invention claimed is:

1. A vacuum cleaner comprising:
    a vacuum cleaner body;
    a suction fan and motor operatively associated with the vacuum cleaner body;
    at least one wheel comprising:
        a wheel body having an axis of rotation;
        a tread surface; and
        a cushion layer radially interposed between the wheel body and the tread surface, the cushion layer comprising a resilient shell having a plurality of resilient cells therein, the shell and the plurality of cells having one or more gasses therein and being dimensioned to damp vibrations and impacts between the tread surface and a floor surface that the tread surface contacts as the wheel body rotates about the axis of rotation.

2. The vacuum cleaner of claim 1, wherein the cushion layer comprises transparent plastic.

3. The vacuum cleaner of claim 2, wherein the cushion layer is visible from the outside of the wheel.

4. The vacuum cleaner of claim 1, wherein the tread surface comprises a separate layer that is connected to the cushion layer.

5. The vacuum cleaner of claim 1, wherein the shell comprises one continuous gas cell extending around the circumference of the wheel, and the plurality of cells comprise a plurality of confined, separate gas cells distributed around the circumference of the wheel and arranged inside the continuous gas cell.

6. The vacuum cleaner of claim 1, wherein the shell comprises an inner radial wall portion, an outer radial wall portion, and first and second laterally spaced side wall portions that join the inner and outer radial wall portions.

7. The vacuum cleaner of claim 6, wherein the plurality of cells comprise one or more generally tubular columns extending from the inner radial wall portion to the outer radial wall portion.

8. The vacuum cleaner of claim 7, wherein the one or more generally tubular columns are between and spaced from the first and second laterally spaced side wall portions.

9. The vacuum cleaner of claim 1, wherein at least one of the shell and the plurality of cells is filled with a gas having generally atmospheric pressure.

10. The vacuum cleaner of claim 1, wherein each of the plurality of cells has at least one opening through a wall defining at least a portion of the cell, such that air can enter and leave the cell through the opening.

11. The vacuum cleaner of claim 1, further comprising one or more fluid passages adapted to permit air from outside the shell to enter and leave an interior space within at least one of the plurality of cells.

12. The vacuum cleaner of claim 1, further comprising one or more fluid passages adapted to permit air from the a first interior space within the shell to enter and leave a second interior space within at least one of the plurality of cells.

13. The vacuum cleaner of claim 12, further comprising one or more additional fluid passages adapted to permit air from outside the shell to enter and leave the first interior space and the second interior space.

14. The vacuum cleaner of claim 1, wherein each of the plurality of cells has at least one opening through a wall defining at least a portion of the cell, such that air can enter and leave the cell through the opening.

15. The vacuum cleaner of claim 1, wherein the vacuum cleaner body comprises a canister vacuum cleaner body having the suction fan and motor contained therein.

16. A vacuum cleaner comprising:
    a vacuum cleaner body;
    a suction fan and motor operatively associated with the vacuum cleaner body;
    a wheel comprising a plurality of discrete cells, the plurality of discrete cells being disposed around the circumference of the wheel, and each discrete cell having a flexible wall and a gas filled chamber surrounded by the flexible wall, wherein the flexible wall is dimensioned to damp vibrations and impacts between the tread surface and a floor surface upon which the tread surface moves.

17. The vacuum cleaner of claim 16, further comprising one or more fluid passages adapted to permit air from outside the plurality of discrete cells to enter and leave the gas filled chamber of at least one of the plurality of discrete cells.

18. The vacuum cleaner of claim 16, further comprising one or more fluid passages adapted to permit air from a first gas filled chamber of at a first one of the plurality of discrete cells to enter and leave a second gas filled chamber of at least a second of the plurality of discrete cells.

* * * * *